US012802054B2

(12) United States Patent
Brydon et al.

(10) Patent No.: US 12,802,054 B2
(45) Date of Patent: Nov. 17, 2026

(54) COMPETITION MANAGEMENT

(71) Applicant: Social Venture Partners, LLC, Newark, CA (US)

(72) Inventors: Antony Brydon, San Francisco, CA (US); Jeff Patterson, Pleasant Hill, CA (US); Brian Wiltin, San Carlos, CA (US)

(73) Assignee: Social Venture Partners, LLC, Newark, CA (US)

( * ) Notice: Subject to any disclaimer, the term of this patent is extended or adjusted under 35 U.S.C. 154(b) by 588 days.

(21) Appl. No.: 17/963,884

(22) Filed: Oct. 11, 2022

(65) Prior Publication Data

US 2023/0222465 A1 Jul. 13, 2023

Related U.S. Application Data

(60) Provisional application No. 63/254,527, filed on Oct. 11, 2021.

(51) Int. Cl.
*G06Q 20/12* (2012.01)

(52) U.S. Cl.
CPC ....... *G06Q 20/123* (2013.01); *G06Q 2220/00* (2013.01)

(58) Field of Classification Search
CPC ........................... A63F 13/795; G06Q 20/123; G06Q 2220/00; G06Q 10/06; G06Q 30/0226; G06Q 50/34; G06Q 20/065; G06Q 30/06
USPC ........................................................... 463/42
See application file for complete search history.

(56) References Cited

U.S. PATENT DOCUMENTS

| | | | | |
|---|---|---|---|---|
| 11,200,569 | B1 * | 12/2021 | James | G06Q 20/381 |
| 11,288,759 | B1 * | 3/2022 | Linden | A63F 13/847 |
| 11,331,579 | B1 * | 5/2022 | Koch | A63F 13/71 |
| 11,338,204 | B1 * | 5/2022 | Koch | A63F 13/216 |
| 12,099,997 | B1 * | 9/2024 | Hoffberg | G06Q 20/065 |
| 12,141,871 | B1 * | 11/2024 | James | G06Q 20/065 |
| 2008/0188290 | A1 * | 8/2008 | MacGuire | G07F 17/32 463/22 |
| 2011/0320536 | A1 * | 12/2011 | Lobb | G06Q 50/01 709/205 |
| 2013/0084969 | A1 * | 4/2013 | Knoles | A63F 13/798 463/29 |
| 2014/0337915 | A1 * | 11/2014 | Kanee | H04N 21/8355 726/1 |
| 2018/0192144 | A1 * | 7/2018 | McElroy | H04N 21/8456 |
| 2019/0262717 | A1 * | 8/2019 | Thielbar | A63F 13/352 |
| 2019/0303960 | A1 * | 10/2019 | Walsh | G07F 17/32 |
| 2021/0275908 | A1 * | 9/2021 | Amer | G06T 7/215 |
| 2021/0357447 | A1 * | 11/2021 | McKenzie | G11B 27/34 |
| 2022/0401842 | A1 * | 12/2022 | Farudi | A63F 13/847 |

(Continued)

FOREIGN PATENT DOCUMENTS

WO 2018208384 A1 * 11/2018 ......... G06Q 30/0243

OTHER PUBLICATIONS

U.S. Appl. No. 63/312,036 provisional application, Farudi et al. (US PG pub 2022/0401842) Jun. 17, 2021 (Year: 2021).*

(Continued)

*Primary Examiner* — Michael A Cuff
(74) *Attorney, Agent, or Firm* — Rimon PC

(57) ABSTRACT

Systems and methods of using NFTs to make competitors and their competitions fungible are described.

18 Claims, 1 Drawing Sheet

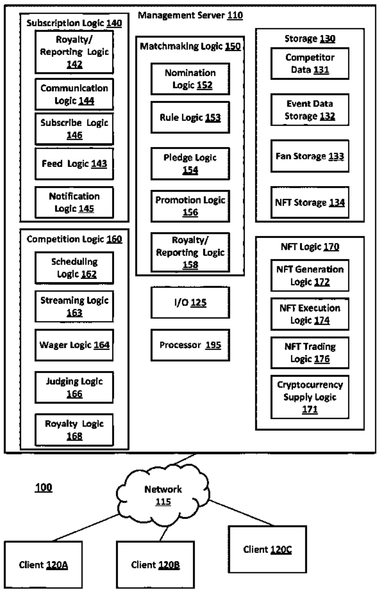

(56) References Cited

U.S. PATENT DOCUMENTS

| | | | | |
|---|---|---|---|---|
| 2023/0101707 A1* | 3/2023 | Smith | A63F 13/35 | |
| | | | 463/42 | |
| 2024/0289895 A1* | 8/2024 | Baker | G06Q 50/01 | |
| 2025/0053628 A1* | 2/2025 | Tali | G06F 21/32 | |

OTHER PUBLICATIONS

NFTrade, “Athletes Are Using NFTs to Provide Tangible Value to Fans and Supporters”, https://medium.com/@NFTrade/athletes-are-using-nfts-to-provide-tangible-value-to-fans-and-supporters-7e227fbb9943, Apr. 12, 2021 (Year: 2021).*

* cited by examiner

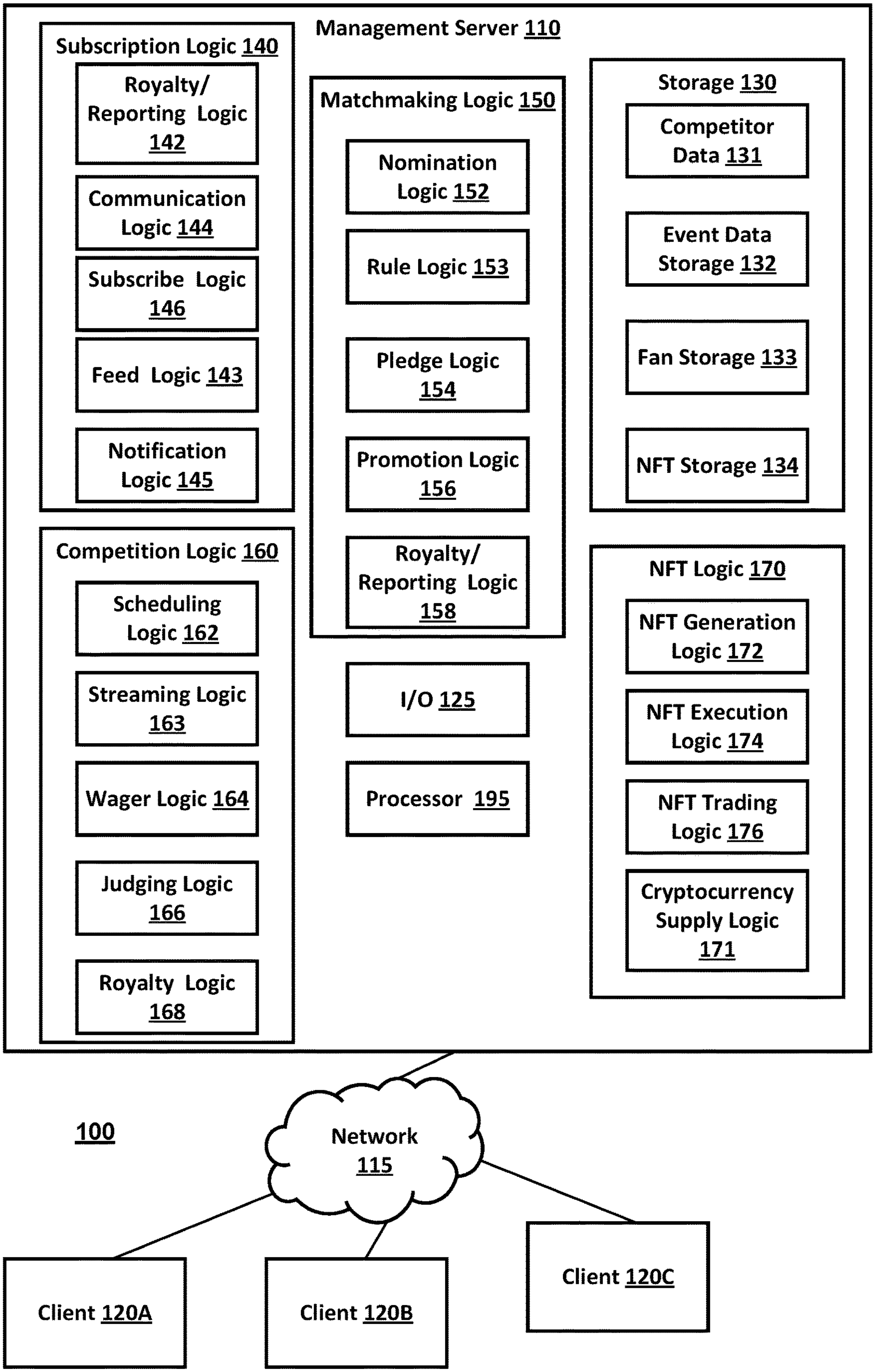
Management Server 110
Subscription Logic 140
Royalty/ Reporting Logic 142
Communication Logic 144
Subscribe Logic 146
Feed Logic 143
Notification Logic 145
Matchmaking Logic 150
Nomination Logic 152
Rule Logic 153
Pledge Logic 154
Promotion Logic 156
Royalty/ Reporting Logic 158
Storage 130
Competitor Data 131
Event Data Storage 132
Fan Storage 133
NFT Storage 134
Competition Logic 160
Scheduling Logic 162
Streaming Logic 163
Wager Logic 164
Judging Logic 166
Royalty Logic 168
I/O 125
Processor 195
NFT Logic 170
NFT Generation Logic 172
NFT Execution Logic 174
NFT Trading Logic 176
Cryptocurrency Supply Logic 171
100
Network 115
Client 120A
Client 120B
Client 120C

COMPETITION MANAGEMENT

CROSS-REFERENCE TO RELATED APPLICATIONS

This application claims benefit of and priority to U.S. provisional patent application Ser. No. 63/254,527 filed Oct. 11, 2021, the disclosure of which is hereby incorporated herein by reference.

BACKGROUND

Historical systems and methods for managing competitive events have limited the ability for the competitors in these events and fans interested in these events to influence these events. Competitors and fans rarely get to determine which matchups happen, where and when they happen, the rules governing the matchups, the judging of the matchups, the purses and prizes awarded to competitors, and the ranking of the competitors. These factors have been historically dominated by competition governing bodies, sports leagues, organizations, team owners and promoters. As a result, the competitors in competitive events often don't get the matchup they are interested in; the events are at times and locations out of their immediate control; the judging of these events, and the ranking of competitors, is often contested and influenced by outside and commercial forces; and the proceeds from these events are distributed to the involved commercial entities with a small fraction of proceeds being awarded to the competitors. Further, historical systems and methods for managing competitive events often fail to adequately reward the competitors for promoting the event, and universally fail to adequately reward fans from promoting the event, even when social media is a significant promotional source of the event.

SUMMARY

Systems and methods for managing competitive events are described. The scope of this management may include organizing and scheduling events, selecting competitors, funding and promotion of events, distribution of value/proceeds from an event, and/or the like. For example, the systems disclosed herein may be used to select competitors for an event based on crowd sourced nominations. In another example, details of the event such as date, location, and rules may be determined or influenced by crowd sourced votes and/or suggestions. In another example, the funds required to produce the event or award to competitors in the event may be, at least in part, crowdsourced and/or based on fan contributions. In another example, the value of a competition, and/or the competitors there of, multiple matchups of a particular competitor, and/or the value of a matchup between two competitors spanning multiple events, may be embodied in a Non-Fungible Token (NFT) and/or a crypto currency coin offering. For example, an NFT may be associated with a particular competitor and rewards paid to holders of the NFT paid in a cryptocurrency, optionally responsive to outcomes of competitions of the competitor. In another example, fans who promote the event effectively as measured by a number of means (social impressions, ad creative creation, website impressions, affiliate revenues from referred backers, funds pledged, and/or platform/subscription sign-ups), driving further funding or promotion sales, may be further compensated with platform credits, additional subscription services, in person tickets to an event, or additional NFT or cryptocurrency. In another example, an entire fight card or ladder tournament can be promoted and executed using the systems and/or methods described herein.

Fans and supporters may participate in the selection of competitors, promote an event, and participate in the financial and/or emotional results of an event. This comprehensive system is distinguished from merely betting on the outcome event in numerous ways. For example, a fan who supports a particular matchup between competitors may promote the matchup (e.g., make it more likely to occur and/or encourage others to support/attend), may obtain an interest, (e.g., access to a competitor, access to content, financial interest, NFT, cryptocurrency and/or tradable interest) in not just the outcome but in the entire event, may obtain an interest in a series (or lifetime) of competitions by a competitor, may obtain an interest in the future value of a competition (e.g., residuals, reruns, video views), may obtain an interest in the current and future value of a prior competition, and/or the like. Such interests may be represented by a record on a blockchain, an NFT, equity stake in a broader company, voting rights for platform governance, royalty payments, may be awarded as a result of a competition outcome, may be awarded as result of participation in competitor selection, event promotion, event viewership or income, and/or competitor promotion, may be purchased, may be traded, and/or any combination thereof.

In one illustrative example, an NFT or coin is issued in association with an up-and-coming MMA fighter. The NFT is optionally divinable into multiple, independently tradable, fractions. The NFT represents an interest in the MMA career of the fighter (and/or in a specific fight or set thereof) and entitles the holder to a royalty based on the competitive and/or monetary success of the fighter. For example, the NFT may entitle the holder to 0.001% of a fighter's purse (winnings) and 0.00001% of the fighter's endorsements. A fan may purchase the NFT as fans would historically purchase player trading cards. However, rather than being a printed piece of cardboard, the NFT could potentially also represent a financial interest in the fighter's success and the value of the fighter's career.

In another illustrative example, a set of NFTs are generated related to a basketball tournament. Some of these NFTs may be based on the success of a particular player in the tournament, some of these NFTs may be based on the success of a particular team in the tournament, some of these NFTs may be based on the identities of the "final four" in the tournament, some of these NFTs may be based on one or more specific results of games played in the tournament, and/or any other determinable aspect of the tournament. The NFTs are sold and are associated with smart contracts that specify how holders/owners of the NFTs are to receive royalties based on outcomes of the tournament and optionally also based on the initial sale value of the NFTs.

In other illustrative examples, an NFT is generated in association with a race house, a formula 1 driver, one or more players of a video game, and/or aspects (players and events) of a fantasy sports league.

Various embodiments include a competition management system comprising: an I/O configured to receive communications from a plurality of clients via a communication network; storage configured to store competitor data, event data and fan data; subscription logic configured for fans to subscribe to competitors; matchmaking logic configured for fans or competitors to participate in the selection of competitors in a competition; competition logic configured for determining competitions, executing competitions, and optionally distributing royalties associated with competitions; and a processor configured to execute at least the matchmaking logic. The competition management system optionally further comprising NFT logic configured to execute and generate NFTs associated with the competitors, the NFT logic including any combination of: NFT Generation Logic configured to generate NFTs associated with a competitor or an event or a series of events between two competitors; NFT Execution Logic configured to execute smart contract associated with the NFTs based on the triggering of at least one system event including occurrence of a competition or outcome of the competition; and NFT Trading Logic configured to facilitate trading of NFTs associated with a particular competition or competitor.

Various embodiments include a method of selecting competitors in a competition, the method comprising: nominating one or more competitors in the competition that pledgers would like to occur, the pledgers including fans; receiving financial pledges for the competition from the pledgers, where the pledgers are only charged for the pledges if the competition occurs; and distributing the pledges for the event to competitors once the event has occurred.

Various embodiments include a method of monetizing success of a competitor, the method comprising: minting a tradable NFT associated with the competitor, the NFT representing a share in success of the competitor in one or more competitions; receiving results of a competition including the competitor; determining a current holder of the NFT based on a blockchain; and distributing a royalty to the holder of the NFT based on the results of the competition.

BRIEF DESCRIPTION OF THE DRAWING

FIG. 1 illustrates a management system configured for management of competitions, according to various embodiments of the invention.

DETAILED DESCRIPTION

The systems and methods described herein may be applied to a wide variety of competitive events. Such competitive events can include predominantly individual sports such as: fights (e.g., sword fights, gladiator fights, boxing, martial arts, mixed martial arts and boxing), automobile racing, badminton, bicycle racing, canoeing and kayaking, eSports and competitive video gaming, fencing, golf, horse racing, motorcycle racing, cycling, powerlifting, tennis and racket sports, table tennis skating, skateboarding, swimming, table tennis, triathlon, track and field, any Olympic events, and/or other competitions. Competitive events can also include team sports such as: American football, Australian rules football or rugby, baseball and softball, basketball, cricket, field hockey and ice hockey, cricket, handball, lacrosse, polo, pickleball, rowing, soccer and volleyball.

Competitive events can also include sports like billiards, bowling, chess and darts, and non-sports events, such as film and/or music competitions (Oscars, Emmys, Tony Awards, Sundance Film Festival, Cannes Film Festival, Video Music Awards, song rankings), dance competitions, singing competitions, cooking competitions, game shows (e.g., Jeopardy, Survivor, The Voice, Eurovision), elections, book awards, box office returns, and/or the like. Competitors in these non-sport events can include directors, actors, singers, artists, dancers, composers, lyricists, cooks, writers, photographers, etc.

FIG. 1 illustrates a Management System 100 configured for management of competitions, according to various embodiments of the invention. Management System 100 (the platform) is optionally a distributed system of multiple computing devices connected by a network and accessed by client applications through a network. Management System 100 includes a competition Management Server 110, Network 115 and Clients 120 (individually referenced 120A, 120B, 120C, etc.). There may be many clients. Clients 120 may have different functionality (e.g., apps) dependent on whether they are used by fans, competitors, or managers. Clients 120 may be used by competitors—the athletes or participants in a given event. Clients 120 may also be used by fans—individuals or groups of individuals that are interested in a given event, competitor, matchup, or sport. Clients 120 may also be used by other types of users, such as promoters (which may be fans or professional event promotors) that are producing an event, sponsors (such as advertisers) that are sponsoring an event, or administrators that are configuring, managing, and operating the platform.

Network 115 can be any communication network including the internet or a local network or a cellular network, which is used by Clients 120 to access and communicate with the Management Server 110.

In various embodiments, Management Server 110 includes Subscription Logic 140 configured to give competitors tools to acquire, manage and energize their paying fans. Management Server 110 also contains Matchmaking Logic 150 configured to turn potential competitions into actual events. Matchmaking Logic 150 is typically configured for promoters, fans, and/or competitors to nominate the matchups they want to see and/or profit from, and optionally for a community of fans come together as a group to fund and/or promote competitions. Management Server 110 also includes Competition Logic 160 configured to broadcast the competitions live or delayed, with a library of competitions optionally available on-demand. Management Server 110 optionally also includes Cryptocurrency/NFT Logic 170 configured to manage cryptocurrency, NFTs, and/or tokenize competitors, events, and matchups that extend beyond a single event. Finally, the Management Server 110 includes Storage 130 configured to store data relevant to each of the modules above, an I/O 125, and a Processor 195.

Management Server 110 can be hosted on any computer system or combination of computer systems connected to a network, including distributed servers hosted in a cloud environment or managed in a co-location facility.

Clients 120 can be any computer system accessible to users of the platform, including mobile apps running on mobile computing devices, desktop applications on desktop computing devices, web applications running on mobile or desktop devices, or APIs that are accessed from mobile devices, desktop devices or servers to offer access to the platform.

Management Server 110 includes an I/O 125 configured to receive communications from a plurality of clients via a communication network, e.g., Network 115.

I/O 125 is an input/output and may be wireless, wired, Ethernet, a router, etc. Clients 120 may be computing devices, mobile devices, etc. Clients 120 are optionally associated with "fans". One or more of Clients 120 may be management devices. Network 115 may include the internet, a cellular network, a local area network, etc. Clients 120 may be associated with competitors or promotors.

A competitor is optionally a fighter or any of the other competitor types discussed herein; or wherein the competition includes a fight or any of the other competitions discussed herein.

Optionally, at least one of the plurality of clients is a mobile device configured for a fan to promote a competition, invest in an NFT, and receive a reward/royalty based on the competition and/or NFT, and/or the like. Optionally, at least one of the plurality of clients is configured for a competitor to set terms of a competition. For example, terms that can be incorporated into a smart contract associated with the competition.

Subscription Logic 140 is configured to give competitors the tools they need to acquire, manage and energize their (optionally paying) fans. For example, a basketball player can use Client 120 to create a profile, then use social media to encourage their fans to subscribe to them, paying a monthly fee (i.e., $9.99) to follow their career in detail, to message with them, to get access to exclusive content like videos of training sessions or prescribed workouts or diets. Subscription Logic 140 includes Subscribe Logic 146, Communication Logic 144, and Royalties/Reporting Logic 142. Communication Logic 144 can include Feed Logic, Notification Logic, and/or logic configured for communication between Management Server 110 and Clients 120.

Competitors can use Client 120 to create a profile that is stored in Competitor Data 131, and can include basic information (i.e., name, sport, height, weight, etc.), career information (i.e., wins, losses, teams, etc.), sponsor information, etc.

Subscribe Logic 146 is configured to allow fans to pay a set monthly fee to subscribe to a competitor. This monthly fee may be a single fee or have different levels that entitle fans to different levels of access and content. For example, a fan may subscribe to their favorite tennis player for $5 per month, and be able to view video footage from practice sessions, while another fan may subscribe to the same tennis player at $25 per month, and gain access to training regimens. In another example, a fan may pay for the subscription in cryptocurrency and may receive a single or monthly NFT in exchange that could grant them additional benefits like access to upcoming events and/or NFTs associated with those events. Subscribe Logic 146 is also configured to allow corporations and other sponsors to subscribe to a fighter at higher price point (i.e., $5,000 per month) supporting a competitor and receiving a set of prescribed benefits and possibly exclusivity in a described category. An interface is configured to allow competitors to designate and solicit the types of sponsors they are interested in, and allows potential sponsors to scan competitors and support one or many.

Feed Logic 143 is configured to show subscribing fans the correct content that their subscription allows for the competitors they have subscribed to. For example, a fan might subscribe to a boxer, tennis player and MMA fighter, and view a feed that combines updates from all three athletes.

Notification Logic 145 is configured to alert subscribers of new content to which they are entitled, new NFTs, new events associated with competitors and/or competitions, royalties they are to receive, and/or current value of their NFTs.

Communication Logic 144 is generally configured to allow communication between the various stakeholders. These stakeholders can include managers (e.g., agents, coaches or team owners), fans, competitors and promotors, and the communication can be 1-to-1 and/or 1-to-many among any combination of these stakeholders.

Royalties/Reporting Logic 142 is configured to distribute payments to competitors based on the subscribers and/or sponsors they have acquired, and the different payment levels each subscriber has committed to. It is also configured to calculate the platform fee deducted from subscription payments, and any associated taxes, credit card fees, etc. It may be configured to pay out royalties using cryptocurrency and/or other items of value. As used herein, the term "royalty" is meant generally to mean dividend, income, money, reward, benefit, or other consideration. The term is not intended to mean a consideration having a particular tax or legal status.

Matchmaking Logic 150 is configured for promotors, managers, fans, and/or competitors to participate in the selection of competitors in a competition, determine the rules of said competitions, manage pledges associated with competitions, promote said competitions, distribute or earn interest in royalties associated with competitions, and report on the royalty distributions. It contains Nomination Logic 152, Rule Logic 153, Pledge Logic 154, Promotion Logic 156, and Royalties/Reporting Logic 158.

Nomination Logic 152 is configured to allow a competitor or fan to use Client 120 to nominate two or more competitors (for a single bout or a tournament style format) that they would like to see compete in an event, with the Competitor Data 131, Event Data 132 and Fan Data 133 all being stored in Storage 130. An event could be for predominantly individual sports like boxing or mixed martial arts ("I would love to see Fighter A fight Fighter B"), for predominantly team sports like soccer ("I would love to see Team A from Mexico play Team B from Italy"), for eSports ("I would love to see Player A play Player B in video sport C", non-sporting events like dance ("I would love to see a Dance-off between celebrity A and celebrity B"), or any of the competitive events described herein. Similarly, a competitor may also use Client 120 to indicate matches that they would be interested in competing in ("I would love to fight B.")

Nomination Logic 152 is optionally also configured to allow a potential competitor to use Client 120 to nominate a competitor they would like to challenge, or to create an event they would like to compete in.

Rules Logic 153 is configured to allow a competitor or fan to use Client 120 to influence other aspects of the event, such as the date ("I want this event to happen in May"), the location ("I want this event to happen in London"), the rules ("I want this event governed by kickboxing rules," the judging ("I want Celebrity A to be a judge"), and other parameters of the competition, which are typically stored in Event Data Storage 132. Fans and competitors can also use Client 120 to vote for an existing event or potential event or the parameters of an event described above.

Rules Logic 153 is optionally also configured to allow a potential competitor to use Client 120 and/or change other aspects of the event as described above. One or more competitors in an event may also use Client 120 to restrict the ability of fans to determine certain aspects of the event (i.e., time, date, location, rules, judges, etc.) For example, two football teams may not want fans to determine the location of a game, or two boxers may not want fans to determine the number of rounds in a fight.

Pledge Logic 154 is configured to allow a fan to use Client 120 to pledge money towards a potential event that is stored in Event Storage 132, creating a pool of money and/or cryptocurrency that is available to competitors in the potential event. Events may be configured for a single fixed pledge amount (i.e., $20), where all fans backing an event pledge the same amount of money and/or cryptocurrency. Alternatively, an event may be configured for varying pledge levels (i.e., $10, $20, or $50) where different levels of pledges are associated with different packages should the event occur. One pledge level may include the right to view the event, while a higher pledge level might include tickets to attend live, and an even higher pledge level might allow the fan to meet the competitors. An event may also have variable pledges, where fans can pledge whatever amount they desire. This Pledge Logic 154 can indicate whether a pledge requires the fan to fully fund the pledge by depositing the full amount via credit card, bank transfer, cryptocurrency or an alternative online payment method, or whether the pledge can be made with a nominal deposit (i.e., $1) along with credit card or other payment methods that allow the remainder of the pledge to be charged automatically when the event occurs, or whether the fan can simply affirm to purchase the event without any fiscal transaction. The ability for a fan to influence the parameters of an event may also be increased or decreased according to the value of the pledge they have made and is determined by both Pledging Logic 154, and Rules Logic 153. Pleading Logic 154 is also configured to allow fans to make complex pledges on different events and competitions. A fan may make a single $20 pledge to three different events, but indicate that the first event to be committed should earn the pledge. This logic creates a dynamic scenario where competitors that commit to one event can impact the pledged amounts for other events, encouraging competitors to commit to events early and often, lest the pledged amounts drop. Pledges are optionally matched or associated with sponsors. For example, a fan that agrees to try or buy a product may get credit for a matching pledge from a sponsor. Pledges may be to provided payment for competitions yet to be determined. For example, a fan may commit to paying $100 of a specific fight between two competitors. Such a pledge may be counted as a vote (worth $100) to schedule the fight. In some embodiments, scheduling a competition is dependent on receiving enough votes (worth a specific value in total).

Pledge Logic 154 may also be configured to allow a fan to receive an NFT or other token associated with the competition in exchange for cryptocurrency, money or other consideration. This token may be resold to other fans and may grant the holder with additional future benefits including access to any competition that is realized and/or an NFT associated with that competition. An NFT owner optionally received more value for a pledge associated with their NFT. For example, an owner in an NFT associated with a specific MMA fighter may receive more benefits for a pledge of a specific value toward that MMA fighter relative to a non-owner of that NFT.

Pledge Logic 154 is also configured to allow a potential competitor to use Client 120 to monitor the pledges on their potential events, and to indicate the level at which they would commit to the event. If and/or when a potential competitor is satisfied with the pledged amount indicated by the Pledge Logic, and the event parameters configured in Rules Logic 153 and stored in Event Data Storage 132, the competitor can "commit" to participate in the event. Once all competitors have committed to participate in an event stored in Event Data Storage 132, the event is then optionally opened to a set of promoters with experience in the type of event who are located in the relevant geographical area.

Promotion Logic 156 is configured to allow fans, competitors and other third parties such as sponsors or promoters to promote an event, via social media or traditional media, using links, QR codes, tokens and other tracking mechanisms that can be used to credit the individual promoting an event with incremental pledges for the event. In concert with NFT Logic 170 and NFT Storage 134, Promotion Logic 156 can be used to reward individuals promoting and event with incremental cryptocurrency, or NFTs associated with a competitor, event, or series of events between two or more competitors. For example, a party with a large Instagram™ or TikTok™ may promote a particular competition and get credits for the success/impact of their promotion. Such credits can include royalties and/or credit to future NFTs.

Royalties/Reporting Logic 158 is configured to calculate financial aspects associated with an event, including the distribution of pledges/royalties associated with an event. Funds may be disbursed to competitors, promoters, etc., at different points in the lifecycle—when the event is created, committed, or completed, depending on the event configuration stored in Event Data Storage 132 or specified by NFT Execution Logic 174. The disbursement of funds is done by the Royalties/Reporting Logic 158, which uses the data in the Event Data Storage 132, fiscal commitments in Pledge Logic 154, and Competitor Data 131 to process the payments. Royalties/Reporting Logic 158 is optionally an embodiment of Royalty/Reporting Logic 142.

Competition Logic 160 is optionally configured to broadcast the competitions and events successfully coordinated by the platform. It includes Scheduling Logic 162 which is used to optimally schedule live events; Streaming Logic 163, which can be used to stream competitions directly or with an OTT (over-the-top) video partner; Wager Logic 164, which can be used to bet on competitions directly or via a betting partner; Judging Logic 166, which can be used by fans to live judge the events, and Royalty Logic 168, which works in concern with Royalty/Reporting Logic 158 to distribute the proceeds from an event. Competition Logic 160 is optionally configured to track participation of competitors in a fantasy sport league and/or real-life competitions.

Scheduling Logic 162 is configured to allow the platform and third-party promoters to work with competitors that have committed to competitions to optimally schedule events in time and locations, so that events get maximal purchases and viewership from fans. Scheduling Logic 162 uses information about competitors stored in Competitor Data 131, information about fans stored in Fan Storage 133, information about the specific event and other events stored in Event Data Storage 132 to optimize the scheduling of specific events and the overall event schedule. For example, two boxers that have committed to fight may indicate a four week window and general geography, and the Scheduling Logic 162 might propose a specific time (i.e. Friday 7 pPT) and location (Sacramento, Calif.), based on the time zones that fans who have pledged support for that fight are in, and the times that typically draw maximal viewership. In some embodiments, Scheduling Logic 162 includes a machine learning system configured to suggest competitions that achieve one or more specific goals, for example, maximum profit to any of the stakeholders. Scheduling Logic 162 may also be configured to schedule events other than a competition. For example, for the promotion of a book or music album.

Streaming Logic 163 is configured to stream events over Network 115 to any Client 120, including mobile apps running on mobile computing devices, desktop applications on desktop computing devices, web applications running on mobile or desktop devices. Streaming Logic 163 includes logic to authorize viewers who have previously pledged to an event to view the event, and to charge other viewers a fee to view the event. It is configured to work with content delivery networks to optimize delivery of the event, and OTT video providers to deliver the event. Streaming Logic 163 is optionally also configured to allow viewers to interactively participate in the event via any Client 120, such that votes, comments, reactions from an individual viewer can be streamed in concert with the event and viewable by other viewers. For example, a boxing fan viewing a fight might judge a round for Fighter A and comment "Nice round!," and other viewers would be able to see the tally of votes for the different fighters for that round, and view the comment. Viewers who have pledged to an event may receive rewards, e.g., a royalty, if the event is successful (e.g., popular or profitable) and/or if a particular competitor is successful.

Wager Logic 164 is configured to allow fans to place bets on a given event or aspect of the event. Wager Logic 164 can be configured differently for individual events and allow different types of bets such as moneyline bets and spread bets that handicap one or more competitors in an event. Wager Logic 164 can also be configured to allow over/under bets, proposition bets and parlay bets. It can also be configured to allow micro-bets and in-play betting. In an example of the latter, a boxing fan might bet on Fighter A to win round 1 but Fighter B to win round 2. Wager Logic 164 can be configured to run bets directly or via a third-party betting partner. In some embodiments, Wager Logic 164 is configured to place bets across an series of competitions, such as a basketball tournament as discussed elsewhere herein.

Judging Logic 166 is configured to allow fans to judge the event. This can include fight fans judging which boxer won an individual round, gymnastic fans judging a specific routine performed by a gymnast, or soccer fans voting on whether a specific foul deserves a yellow card. Judging logic can run in nominal terms, allowing all viewers of an event to judge via a voting system, weight the votes according to the viewers that pledged to see the event, and/or restrict judging to a subset of judges approved by the competitors in an event. In some embodiments Judging Logic 166 is configured for fans to vote on the appropriateness of a referee's call or lack thereof.

Storage 130 is configured to store digital data and may include some combination of storage devices including hard drive, optical drive, static memory, ROM, RAM, etc. Storage 130 is comprised of Competitor Data Storage 131, Event Data Storage 132, Fan Storage 133, and/or NFT Storage 134.

Competitor Data Storage 131 is configured to store information about competitors. This can include any personal attributes of the competitor, such as name, height, weight, and/or age as well as other information about their interests and personality. It may also include information about their careers such as prior and upcoming competitions and results of these. It may also include information about their presence on the platform, including earnings, minted NFTs in NFT Storage 134, NFT values/transactions, associated subscribers in Fan Storage 133 and associated competitions in Event Data Storage 132.

Event Data Storage 132 is configured to store information about events. This information can include the competitors in Competitor Data 131 associated with (e.g., participating in) the event and any specifics or criteria regarding specifics such as, ticket sales/prices, location and/or date and time. This information may also include data regarding the outcome of the competition and any notable moments of the event. It may also include information associated with pledges from fans in Fan Storage 133 and NFTs generated for the event in NFT Storage 134.

Fan Storage 133 is configured to store information associated with fans, including personal information such as name, age and location. The stored information may be about fans' subscriptions to competitors in Competitor Data 131 and pledges for events in Event Data Storage 133. In addition, the stored information may include data about the fans' monetary transactions on the platform including any monetary or cryptocurrency amounts paid to competitors in Competitor Data 131 or for events in Event Data Storage 132. The stored information can include royalties owed or received by fans, either based on NFT ownership and/or pledges made. The stored information can include NFTs owned by fans. The stored information can include cryptocurrency and/or wallet information of the fans.

NFT Storage 134 includes information about the NFTs that are minted and/or traded on the platform, transactions associated with those NFTs and contract information included with those NFTs. This includes NFTs minted for competitors in Competitor Data 131 and events in Event Data 132. NFT Storage 134 is optionally also configured to store a record of terms associated with the NFT smart contracts and the rights and rules specified within. As described elsewhere herein, the NFTs may represent a single event, a series of events, a single competitor, a single event for a competitor or any association between competitors, events and time.

Cryptocurrency/NFT Logic 170 is configured to provide a platform cryptocurrency and/or collectable NFTs associated with elements of the system, such as competitors in Competitor Data 131 and events in Event Data Storage 132. The NFTs provide fans with an element of ownership in these entities as well as possible rights and privileges provided by associated smart contracts. The optional cryptocurrency provides fans with a token they can use in transactions such as competitor subscriptions in Subscription Logic 146, event pledges in Pledge Logic 154, wagers in Wager Logic 164 and NFT purchases associated with NFT Storage 134. In addition, fans may resell their NFTs for cryptocurrency or fiat, or exchange between cryptocurrency and fiat.

Cryptocurrency Supply Logic 171 is configured to control the economy of the tokens used for transactions. This includes minting or burning of tokens, the ability to exchange tokens for other currencies (e.g., fiat), and granting of tokens to competitors and fans based on activities such as promotions, referrals, and/or verification. These tokens may also carry governance rights that grant the token holder to additional control over elements of the platform, e.g., rights over a subset of rules or decisions associated with a competitor or a competition. These rights may include voting privileges associated with Judging Logic 166, allocation of a portion of profits from competitions, or approval of sponsors associated with the system and/or competitions. The cryptocurrency may be an existing publicly traded cryptocurrency or a cryptocurrency associated specifically with the platform.

NFT Generation Logic 172 is configured to control which NFTs are minted and how they are made available. NFTs may be generated for competitors in Competitor Data 131 or events in Event Data Storage 132 or may be independently generated as part of a promotion. Competitor NFTs can be generated as special one-off NFTs to commemorate an achievement or could be generated monthly and included as part of a competitor subscription. For example, a fan may choose to subscript to NFTs associated with a particular competitor or team. Event NFTs can be associated with a specific event or a series of events. Each NFT can grant the holder with additional benefits and access, including royalties, personal interactions with competitors or streaming access to events. In some embodiments, NFT Generation Logic 172 is configured to terminate an NFT. For example, at the end of a series of competitions associated with the NFT. Alternatively, an NFT may be associated with a stream of residual royalties, such as when an old competition event is viewed on YouTube™. NFT Generation Logic 172 is optionally configured to divide an NFT into fractions thereof. Thus, if a competitor sells 10 NFTs, each representing 1% of their earning in the next 5 years, one or more of these original NFTs may be divided into two NFTs each representing 0.5% of the competitor's earnings in the next 5 years. Or, one or more of these original NFTs may be divided into 5 NFTs each representing a different year.

NFT Execution Logic 174 is configured to control the release of royalties and other benefits to NFT holders when ownership is changed and/or an event takes place. NFT Execution Logic 174 is responsive smart contracts associated with corresponding NFTs. These contracts can allow for royalties associated with the NFT to be paid to the current holder or for additional royalties to be paid to associated competitors when the NFT is resold. In one example, an NFT may be minted for an event, details of which are stored in Event Data Storage 132. A smart contract associated with the minted NFT is configured to provide a holder of the NFT with a royalty including a % of streaming revenue generated by that event on an ongoing basis. NFT Execution Logic 174 is optionally configured to execute a smart contract associated with an event or NFT. In one example, a NFT is minted with a smart contract that grants the current NFT holder with a percentage of monthly revenue generated by an event. The actual percentage specified could be determined based on the number of NFTs generated and/or the demand for the event and/or any other information available to the system. A process may calculate event revenues each month and make them available to an off-chain oracle that pushes the information to the smart contract, which would then transfer the percentage of revenue to the current NFT holder's wallet. In another example, a NFT is tied to a smart contract configured to provide a holder with 1% of a competitor's future earnings (or other future interests), over a fixed period or lifetime of the competitor. For example, an NFT may be associated with a smart contract that specifies a royalty is to be paid to the NFT holder, the royalty comprising 1% of a competitor's future purse winnings and 2% of their future sponsorship revenue. As such, the NFTs represents a share future earnings of a member of the competitors, the share being responsive to a smart contract and competitions in which the member of the competitor competes.

NFT Trading Logic 176 controls how NFTs are transferred from one holder to another. A holder of any NFT may offer their NFT up for trade for another NFT or may sell it for cryptocurrency (or fiat) as specified in Cryptocurrency Supply Logic 171. When the NFT is traded, the smart contract is optionally executed so that any royalties associated with the trade or sale may be transferred to associated wallets, including any associated competitors.

Processor 195 is configured to execute at least the matchmaking logic 150 or the competition logic 160. Processor 195 can be, for example, an electronic or digital microprocess; can include a general-purpose process configured to perform specific functions responsive to the logic discussed herein. Processor 195 typically includes an electronic and/or optical circuit.

Several embodiments are specifically illustrated and/or described herein. However, it will be appreciated that modifications and variations are covered by the above teachings and within the scope of the appended claims without departing from the spirit and intended scope thereof. For example, the teachings herein relating to fights and athletics may be applied to other types of competitions, such as poker, chess, dog shows, start-up competitions, science or academic competitions, and/or the like.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems and/or logic referred to herein can comprise an integrated circuit, a microprocessor, a personal computer, a server, a distributed computing system, a communication device, a network device, or the like, and various combinations of the same. A computing system or logic may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), optical circuits, and/or other devices configured for storing analog or digital information, such as in a database. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The "logic" discussed herein is explicitly defined to include hardware, firmware or software stored on a non-transient computer readable medium, or any combinations thereof. This logic may be implemented in an electronic and/or digital device (e.g., a circuit) to produce a special purpose computing system. Any of the systems discussed herein optionally include a microprocessor, including electronic and/or optical circuits, configured to execute any combination of the logic discussed herein. The methods discussed herein optionally include execution of the logic by said microprocessor.

The invention claimed is:

1. A competition management system comprising:

an I/O configured to receive communications from a plurality of clients via a communication network;

storage configured to store competitor data, event data and fan data;

subscription logic configured for fans to subscribe to competitors;

matchmaking logic configured for the fans to participate in the selection of competitors in a competition;

competition logic configured for determining competitions, executing competitions, and distributing royalties associated with competitions to the fans, the royalties including rewards for the competitors winning or losing the competition; and a processor configured to execute at least the matchmaking logic.

2. A competition management system of claim 1, further comprising NFT logic configured to execute and generate NFTs associated with the competitors, the NFT logic including any combination of:

NFT Generation Logic configured to generate NFTs associated with a competitor or an event or a series of events between two competitors;

NFT Execution Logic configured to execute smart contract associated with the NFTs based on the triggering of at least one system event including occurrence of a competition or outcome of the competition; and NFT Trading Logic configured to facilitate trading of NFTs associated with a particular competition or competitor, wherein the NFT represents a share of the royalties and execution of the smart contract includes distribution of the share of the royalties.

3. The system of claim 2 further comprising judging logic configured for fans to participate in the judging of competitions.

4. The system of claim 2, wherein the competitors include a fighter and the competitions include a real-life fight.

5. The system of claim 2, wherein the competitors include an American style football player, a baseball player, a basketball player, a soccer player, a bicyclist, a runner, a driver or a poker player, and the competition is a real-life sporting event.

6. The system of claim 2, wherein the competition logic is configured to track participation of the competitors in a fantasy sports league, the competitions being real-life events.

7. The system of claim 2, wherein at least one of the plurality of clients includes a competitor interface configured for competitors to acquire fans as subscribers, broadcast content to their fans, communicate with their fans, promote themselves and their competitions, challenge other competitors, follow events that fans have nominated them for, track their pledges, commit to events or earn payments and royalties associated with their subscriber bases and committed events.

8. The system of claim 2, wherein the storage is configured to store fan data including wallets of fans in which records of the fans cryptocurrency or NFT ownership are specified, the NFT data including identifiers of owners of NFTs, the NETS each associated with real-life individual competitors.

9. The system of claim 8, wherein the storage is configured to store pledges made by a fan to the competitions, the pledges representing commitments to payments by the fan if the competitions occur.

10. The system of claim 2, wherein the NFTs represent future financial interests in earnings of the competitors.

11. The system of claim 2, wherein a member of the NFTs represents a share of future earnings of a member of the competitors, the share being responsive to a smart contract and competitions in which the member of the competitors competes, the member of the competitors being a real-life person.

12. The system of claim 2, wherein the ownership of the NFTs grants a holder of the NET with governance rights over a subset of rules or decisions associated with a competitor or a competition.

13. The system of claim 2, wherein the NFT Execution Logic is further configured to distribute a royalty to a holder of a member of the NFTs responsive to the smart contract based on triggering of at least one system event including occurrence of a real-life competition or outcome of the competition.

14. The system of claim 2, wherein the NFTs represent future financial interests in real-life camings of the competitors, the future financial interests being dependent on success of the competitors in competitions.

15. The system of claim 2, further comprising Cryptocurrency Supply Logic configured to supply NFTs that can be purchased by, granted to, and resold by users of the system for the purpose of executing transactions in the system, the transactions including payment of royalties based on the performance of competitors in the competitions.

16. The system claim 2, wherein the NFTs are each divisible into subunits each subunit representing a subunit of a share in future success of the competitor in competitions.

17. The system of claim 1, wherein the competition is a real-life competition.

18. The system of claim 1, wherein the competition logic is configured to distribute the royalties to the fans.

* * * * *